United States Patent
Narula et al.

(10) Patent No.: US 12,133,282 B2
(45) Date of Patent: Oct. 29, 2024

(54) METHOD FOR INTERFERENCE AVOIDANCE

(71) Applicant: Dell Products L.P., Round Rock, TX (US)

(72) Inventors: Harpreet S. Narula, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 431 days.

(21) Appl. No.: 17/481,339

(22) Filed: Sep. 22, 2021

(65) Prior Publication Data

US 2023/0087730 A1 Mar. 23, 2023

(51) Int. Cl.
*H04W 8/00* (2009.01)
*H04W 4/80* (2018.01)
*H04W 84/18* (2009.01)

(52) U.S. Cl.
CPC ............. *H04W 8/005* (2013.01); *H04W 4/80* (2018.02); *H04W 84/18* (2013.01)

(58) Field of Classification Search
CPC ........ H04W 8/005; H04W 4/80; H04W 84/18
USPC ....................................................... 455/41.2
See application file for complete search history.

(56) References Cited

U.S. PATENT DOCUMENTS

| | | | | |
|---|---|---|---|---|
| 9,363,644 B2* | 6/2016 | Jin | ........................... | H04W 4/02 |
| 9,813,854 B2* | 11/2017 | Jin | ........................... | H04W 4/02 |
| 9,888,337 B1* | 2/2018 | Zalewski | ........... | G06Q 30/0635 |
| 9,961,523 B1* | 5/2018 | Daoura | .................. | H04W 4/185 |
| 10,330,783 B1* | 6/2019 | Yuan | .................... | H04W 64/006 |
| 11,620,879 B2* | 4/2023 | Zalewski | ............. | G07G 1/0072 705/26.8 |
| 11,677,828 B2* | 6/2023 | Larsson | ..................... | H04L 9/32 348/159 |
| 11,705,933 B1* | 7/2023 | Zalewski | ................ | H04L 67/10 455/41.2 |
| 11,765,601 B2* | 9/2023 | Narula | .................. | H04W 88/18 455/11.1 |

(Continued)

OTHER PUBLICATIONS

Argenox, BLE Advertising Primer, retrieved from the Internet Aug. 31, 2021, https://www.argenox.com/library/bluetooth-low-energy/ble-advertising-primer/#bluetooth-5-0-advertising-extensions.

(Continued)

*Primary Examiner* — April G Gonzales
(74) *Attorney, Agent, or Firm* — Terrile, Cannatti & Chambers, LLP; Stephen A. Terrile

(57) ABSTRACT

A system, method, and computer-readable medium are disclosed an operation for avoiding interference between a plurality of communication protocols. The operation includes: configuring a host to detect a Bluetooth Low Energy (BLE) client device, the host being BLE enabled; using the host to detect whether the BLE client device is present; triggering a private beacon when the BLE client device is present; identifying active WiFi channels associated with the host and the BLE client device; configuring the host to communicate with a BLE client device via a Bluetooth Low Energy (BLE) connection, the BLE connection comprising a plurality of channels, the device functioning as a BLE-enabled host device; and, establishing an ad-hoc, mesh network between the host and the BLE client device using the active WiFi channels and the BLE connection.

20 Claims, 8 Drawing Sheets

(56) References Cited

U.S. PATENT DOCUMENTS

| | | | | |
|---|---|---|---|---|
| 2015/0356289 A1* | 12/2015 | Brown | ............... | G06F 21/35 |
| | | | | 726/7 |
| 2016/0020861 A1* | 1/2016 | Jin | ............... | H04W 4/023 |
| | | | | 455/456.1 |
| 2016/0021511 A1* | 1/2016 | Jin | ............... | H04W 4/02 |
| | | | | 455/457 |
| 2016/0100311 A1* | 4/2016 | Kumar | ............... | H04W 12/06 |
| | | | | 726/7 |
| 2016/0212582 A1* | 7/2016 | Jin | ............... | H04W 4/80 |
| 2017/0064490 A1* | 3/2017 | Jin | ............... | H04W 4/025 |
| 2017/0296057 A1* | 10/2017 | Freeman | ............... | A61H 31/005 |
| 2018/0206177 A1* | 7/2018 | Daoura | ............... | H04W 4/80 |
| 2018/0248860 A1* | 8/2018 | Xhafa | ............... | H04W 12/0471 |
| 2019/0087807 A1* | 3/2019 | Choi | ............... | H04L 9/3226 |
| 2022/0200789 A1* | 6/2022 | Lalande | ............... | H04L 9/085 |

OTHER PUBLICATIONS

Mohammad Afaneh, Novelbits, How Bluetooth Low Energy Works: Advertisements (Part 1), https://www.novelbits.io/bluetooth-low-energy-advertisements-part-1/, Apr. 21, 2020.

\* cited by examiner

METHOD FOR INTERFERENCE AVOIDANCE

BACKGROUND OF THE INVENTION

Field of the Invention

The present invention relates to information handling systems. More specifically, embodiments of the invention relate to performing a network traffic routing operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for avoiding interference between a plurality of communication protocols, comprising: configuring a host to detect a Bluetooth Low Energy (BLE) client device, the host being BLE enabled; using the host to detect whether the BLE client device is present; triggering a private beacon when the BLE client device is present; identifying active WiFi channels associated with the host and the BLE client device; configuring the host to communicate with a BLE client device via a Bluetooth Low Energy (BLE) connection, the BLE connection comprising a plurality of channels, the device functioning as a BLE-enabled host device; and, establishing an ad-hoc, mesh network between the host and the BLE client device using the active WiFi channels and the BLE connection.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: configuring a host to detect a Bluetooth Low Energy (BLE) client device, the host being BLE enabled; using the host to detect whether the BLE client device is present; triggering a private beacon when the BLE client device is present; identifying active WiFi channels associated with the host and the BLE client device; configuring the host to communicate with a BLE client device via a Bluetooth Low Energy (BLE) connection, the BLE connection comprising a plurality of channels, the device functioning as a BLE-enabled host device; and, establishing an ad-hoc, mesh network between the host and the BLE client device using the active WiFi channels and the BLE connection.

In another embodiment the invention relates to a computer-readable storage medium embodying computer program code, the computer program code comprising computer executable instructions configured for: configuring a host to detect a Bluetooth Low Energy (BLE) client device, the host being BLE enabled; using the host to detect whether the BLE client device is present; triggering a private beacon when the BLE client device is present; identifying active WiFi channels associated with the host and the BLE client device; configuring the host to communicate with a BLE client device via a Bluetooth Low Energy (BLE) connection, the BLE connection comprising a plurality of channels, the device functioning as a BLE-enabled host device; and, establishing an ad-hoc, mesh network between the host and the BLE client device using the active WiFi channels and the BLE connection.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
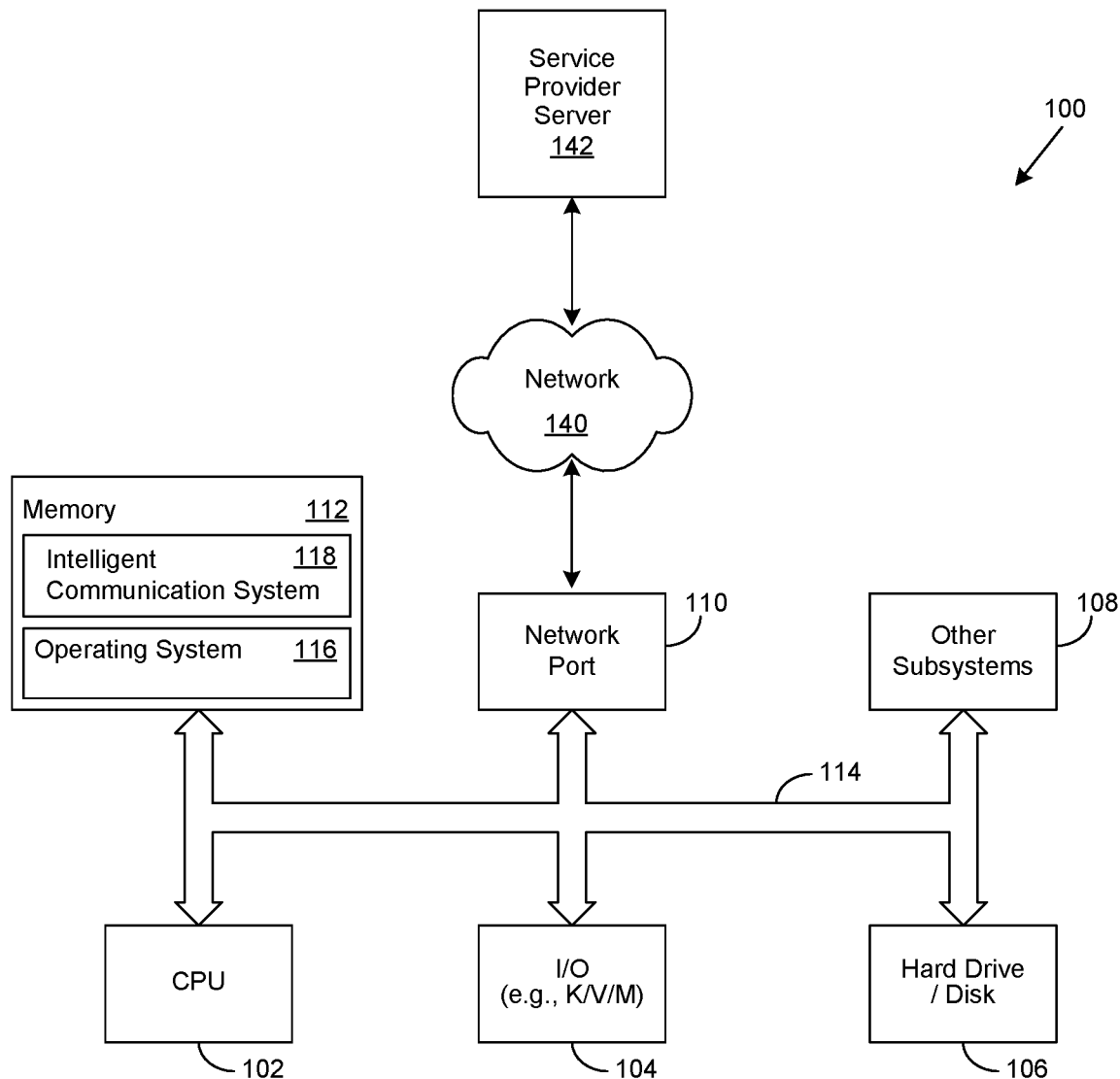
FIG. 1 shows a general illustration of components of an information handling system as implemented in the system and method of the present invention.

A system, method, and computer-readable medium are disclosed for performing a Bluetooth Low Energy (BLE) interference avoidance operation. Certain aspects of the invention reflect an appreciation that there is an increasing need to efficiently and securely get data from where it may be stored or generated to where it is needed, whether that be in a collaboration room, a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Certain aspects of the invention reflect an appreciation that various approaches are known for managing peer-to-peer communication. However, such approaches are typically not oriented to avoiding interference between various communication protocols using the same radio frequency (RF) spectrum. One such example is the Bluetooth and Wireless Fidelity (WiFi) communication protocols, which both use the 2.4 gigahertz (GHz) band. In particular, the Low Energy variant of Bluetooth (BLE) uses Bluetooth channels '37,' '38,' and '39' to advertise the presence of a BLE device to other BLE-enabled devices that may be in its proximity. However, these BLE advertisement channels may experience interference from WiFi channels using the same frequency.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to perform a Bluetooth Low Energy (BLE) connectivity interference avoidance operation, described in greater detail herein. In certain embodiments, the BLE connectivity interference avoidance operation may be performed by the intelligent connectivity system 118 during operation of an information handling system 100. In certain embodiments, the performance of the BLE connectivity interference avoidance operation may result in the realization of improved BLE network connectivity for the information handling system 100, as described in greater detail herein.

Figure 2:
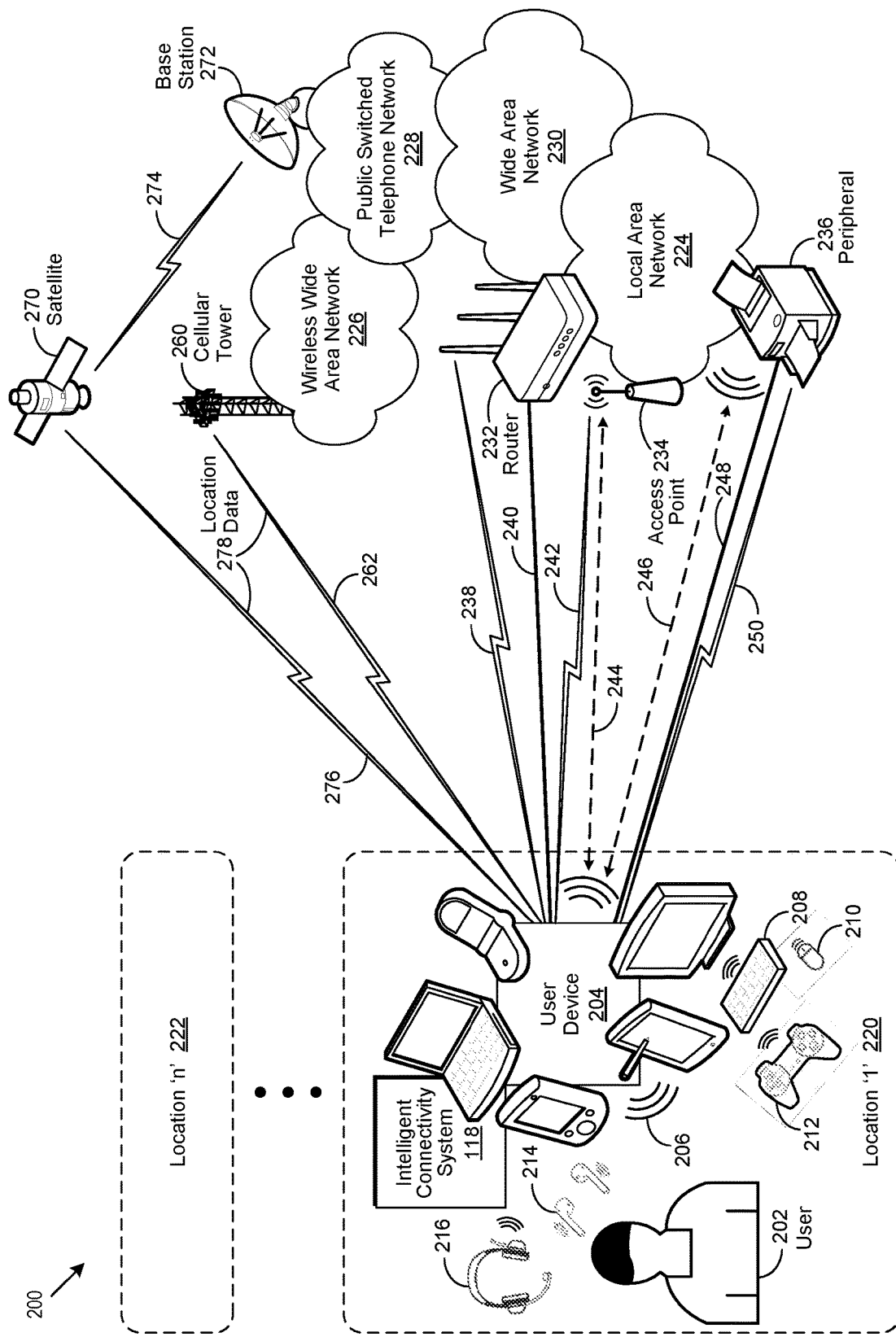
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN 206 may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204, is physically connected to.

In certain embodiments, the user device 204 may be implemented with communication hardware and software that allows it to communicate with one or more access points 234 via a PAN 242 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, and 276. In certain of these embodiments, bandwidth respectively corresponding to the two or more network links 206, 238, 240, 242, 244, 246, 248, 250, 262, and 276 may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, and 276 according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data to and from an external resource, such as a remote server, as if it was directly connected to the private network. Certain embodiments of the invention reflect an appreciation that a single VPN may not always be sufficient for a particular operational mode. Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links.

Figure 3:
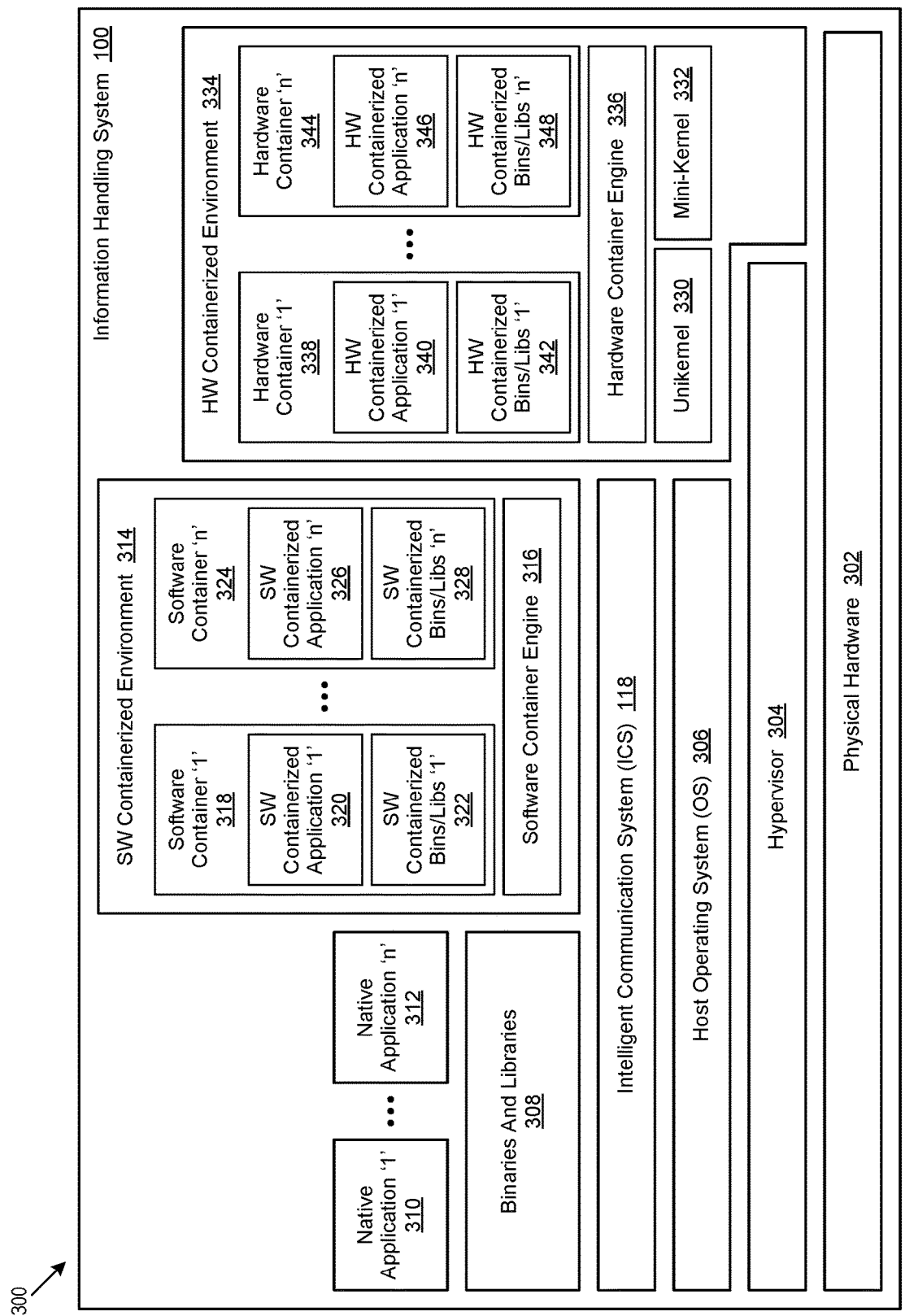
FIG. 3 shows a simplified block diagram of a hybrid container environment.

FIG. 3 shows a simplified block diagram of a hybrid container environment implemented in accordance with an embodiment of the invention. Skilled practitioners of the art will be familiar with the concept of a container, which as typically implemented is a virtualized runtime environment whose components include an application and the executables, binaries, libraries, and configuration files needed to run it. In certain embodiments, the functionality of an application executing within a container may be provided as a service, familiar to those of skill in the art. Certain embodiments of the invention reflect an appreciation that such containerization of an application and its dependencies allows differences in operating system (OS) distributions and underlying infrastructures to be abstracted such that the application can run on any host system.

Likewise, certain embodiments of the invention reflect an appreciation that a container is also granted its own isolated portion of an information handling system's 100 compute, memory, storage, and input/output (I/O) resources at runtime. Certain embodiments of the invention likewise reflect an appreciation that an individual container may be implemented to run anything from a small microservice, to a software process, to a complex software application.

In various embodiments, the hybrid container environment 300 may be implemented on an information handling system (IHS) 100, described in greater detail herein. In certain embodiments, the IHS 100 may be implemented to include certain physical hardware 302, a hypervisor 304, a host operating system (OS) 306, and an intelligent communication system (ICS) 118, likewise described in greater detail herein. In certain of these embodiments, the hypervisor 304 may be implemented to support the host OS 306, a unikernel 330, or a mini-kernel 332, or a combination thereof.

In various embodiments, the host OS 306 may be implemented to support the ICS 118, one or more binaries or libraries 308, or a software (SW) containerized environment 314, or a combination thereof. In certain embodiments, the ICS 118 may be implemented to perform a dynamic workspace connectivity management operation. As used herein, a dynamic workspace connectivity management operation broadly refers to any operation whose performance results in improved and more secure network connectivity for the IHS 100 and its associated workspaces. As likewise used herein, a workspace broadly refers to one or more workloads, applications, processes, or services, or a combination thereof.

In certain embodiments, a particular workspace may be implemented to run as an individual native application '1' 310 through 'n' 312, in an individual SW container '1' 318 through 'n' 324, or in an individual HW container '1' 338 through 'n' 344. In certain embodiments, the workspace may be implemented to run in a cloud environment, or on an endpoint IHS 100, or a combination of the two. In certain embodiments, the one or more binaries or libraries 308 may in turn be implemented to support one or more native applications '1' 310 through 'n' 312. In certain embodiments, the unikernel 330 or mini-kernel 332 may individually be implemented to support a particular hardware (HW) containerized environment 334. Skilled practitioners of the art will be familiar with a unikernel 330, which is a specialized, single address space machine image constructed by using library operating systems. In typical implementations, a developer selects, from a modular stack, the minimal set of libraries corresponding to the OS constructs needed for a particular application to run.

These libraries are then compiled with the application and its dependencies code to build sealed, fixed-purpose images (i.e., unikernels), which run directly on a hypervisor 304 or physical hardware 302 without an intervening host OS 306 such as Linux™ or Windows™. Those of skill in the art will likewise be familiar with a mini-kernel 332, often referred to as a microkernel, which is the near-minimum amount of software that can provide the mechanisms needed to implement an OS. In certain embodiments, such mechanisms may include low-level address space management, thread management, and inter-process communication (IPC). In certain embodiments, a mini-kernel 332 may be used by the HW container engine 336 to generate one or more HW containers '1' 338 through 'n' 334 that can be implemented to run directly on a hypervisor 304 or physical hardware 302 without an intervening host OS 306.

As used herein, a containerized environment, such as the SW containerized environment 314 and the HW containerized environment 330 shown in FIG. 3, broadly refers to a computing environment in which applications may be run in containers. In certain embodiments, such a containerized environment may be implemented to include a single type of container or multiple types of containers. In certain embodiments, the containerized environment may be implemented to exist on an end user computing device or on a server computing device.

In various embodiments, the SW containerized environment 314 may be implemented to include a SW container engine 316. In certain of these embodiments, the SW container engine 316 may be implemented to generate and manage one or more SW containers '1' 318 through 'n' 324. Examples of such SW containers include DOCKER™ and SNAP™ containers. In certain embodiments, the one or more SW containers '1' 318 through 'n' 324 may likewise be implemented to respectively include SW containerized applications '1' 320 though 'n' 326 and their associated binaries and libraries '1' 322 through 'n' 328. In certain embodiments, the one or more SW containers '1' 318 through 'n' 324 may be distributed from a trusted source.

Likewise, in various embodiments, the HW containerized environment 334 may be implemented to include a HW container engine 336. In certain of these embodiments, the HW container engine 336 may be implemented to use either a unikernel 330 or a mini-kernel 332 to generate and manage one or more HW containers '1' 338 through 'n' 344. Examples of such HW containers include HYPER-V DOCKER™ and Intel CLEAR™ containers.

In certain embodiments, the one or more HW containers '1' 338 through 'n' 344 may likewise be implemented to respectively include HW containerized applications '1' 340 though 'n' 346 and their associated binaries and libraries '1' 342 through 'n' 348. In certain embodiments, the one or more HW containers '1' 338 through 'n' 344 may be distributed from an untrusted source. Certain embodiments of the invention reflect an appreciation that HW containers typically require higher operational overhead than their SW container peers, but provide better isolation from the hypervisor 304, and hence, better security.

In various environments, a SW containerized environment 314 or a HW containerized environment 364 may be implemented to isolate a particular containerized application from native applications and other containerized applications. As an example, the HW containerized environment 364 may be implemented to isolate HW containerized application '1' 340 from native applications '1' 310 through 'n' 312 and SW containerized applications '1' 320 through 'n' 326. To continue the example, the SW containerized environment 314 may be implemented to isolate SW containerized application '1' 320 from native applications '1' 310 through 'n' 312 and HW containerized applications '1' 340 through 'n' 346.

In various embodiments, SW containers '1' 318 through 'n' 324, or HW containers '1' 338 through 'n' 344, or a combination thereof, may be implemented to run in a cloud environment. In certain of these embodiments, the SW containers '1' 318 through 'n' 324, or HW containers '1' 338 through 'n' 344, or a combination thereof, may be implemented to be served up to a client through a web apps orchestration layer familiar to skilled practitioners of the art. In certain embodiments, the SW containers '1' 318 through 'n' 324, or HW containers '1' 338 through 'n' 344, or a combination thereof, may be implemented to be served up to a client through a Virtual Desktop Infrastructure (VDI) or in the form of a Progressive Web App (PWA).

Certain embodiments of the invention reflect an appreciation that it is becoming more common for organizations to use containerization solutions. Likewise, certain embodiments of the invention reflect an appreciation that containerization allows applications and services to be implemented on a cloud-based management server or other centralized repository as opposed to being installed on end-user devices. Various embodiments of the invention likewise reflect an appreciation that while containerization provides certain benefits, it also introduces a number of limitations.

For example, if a containerized application needs access to a peripheral, the peripheral will need to be mapped to the container in which the application in hosted. However, doing so may prevent other applications that are not hosted in the same container from accessing the peripheral. As an example, if a printer is mapped to SW container '1' 318, SW containerized application 320 may be able to access the printer, but SW containerized application 'n' 326 and HW containerized applications '1' 340 through 'n' 346 may not.

Figure 4:
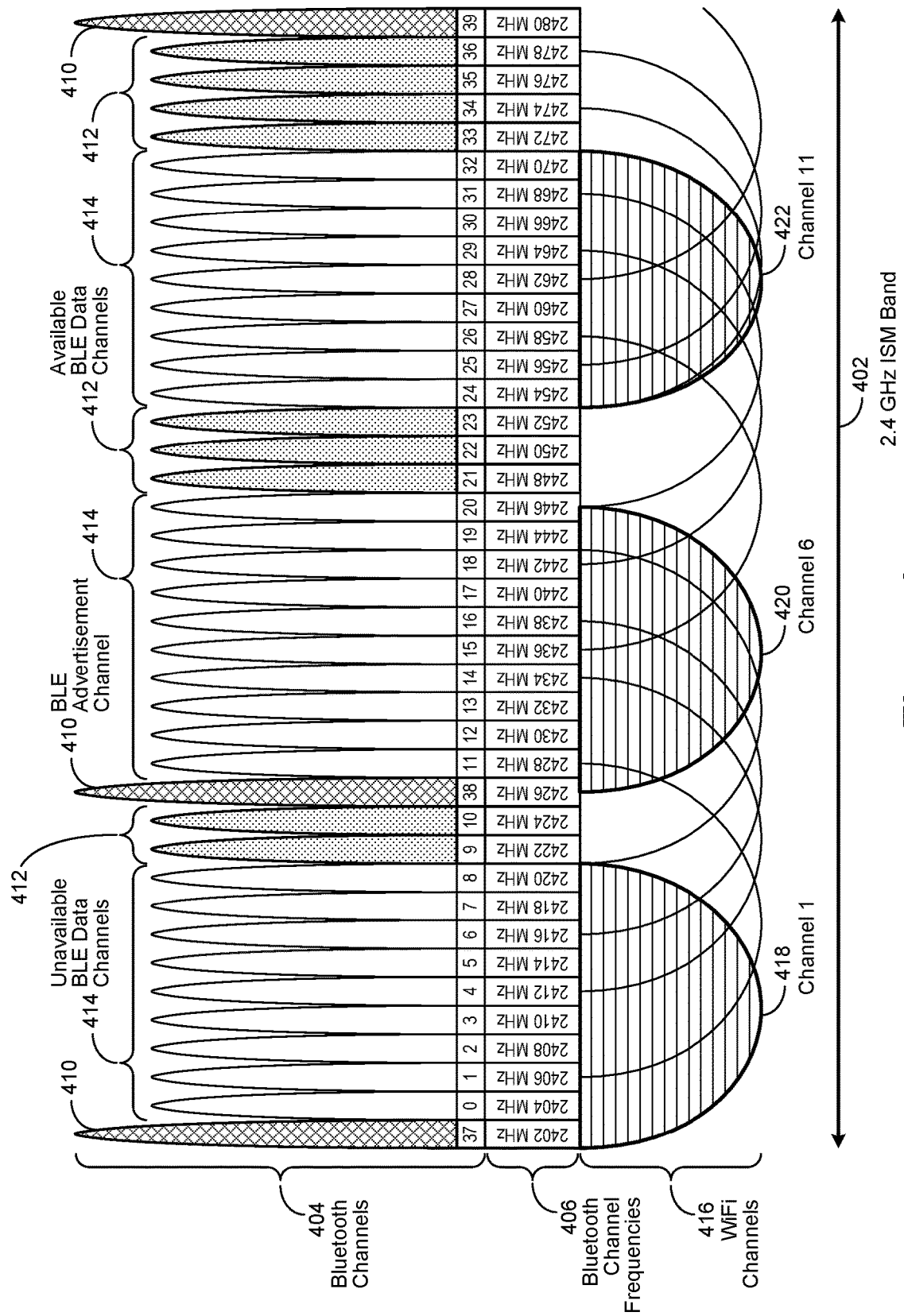
FIG. 4 shows a simplified block diagram of interference between Bluetooth Low Energy (BLE) and Wireless Fidelity (WiFi) channels.

FIG. 4 shows a simplified block diagram of interference between Bluetooth Low Energy (BLE) and Wireless Fidelity (WiFi) channels implemented in accordance with an embodiment of the invention. Skilled practitioners of the art will be familiar with Bluetooth, a short-range, wireless communications technology that in certain implementations uses the 2.4 Gigahertz (GHz) industrial, scientific, and medical (ISM) band 402 of radio spectrum to exchange data between fixed and mobile devices. According to the current version of the Bluetooth standard, this ISM band 402 is broken into forty Bluetooth 404 channels, numbered 0 through 39, each of which is allocated a bandwidth of two Megahertz (MHz), spanning the frequency range 406 of 2.402 GHz to 2.48 GHz.

Those of skill in the art will likewise be aware that Bluetooth Low Energy (BLE) is an incompatible adaptation of the original Bluetooth standard that consumes less power and is targeted for a wide variety of applications that periodically exchange small amounts of data. Examples of such applications include wearable health fitness devices, industrial monitoring sensors, location-based promotions, public transportation apps, various Internet of Things (IoT) devices and applications, and so forth. Another use of BLE is to provide a beacon that broadcasts a radio signal at short, regular intervals advertising the presence of an associated device to other Bluetooth devices when they are in range.

Likewise, skilled practitioners of the art will be aware that the BLE standard specifies a BLE-enabled device has two ways of communicating. The first is by using advertisements, where one BLE-enabled device broadcasts packets of identification and other information to every Bluetooth device in its proximity. The receiving device can then act upon the information it receives. Alternatively, the receiving device can establish a connection, which typically only lasts for a few milliseconds, with the broadcasting device. Once the connection is established the two devices can exchange information.

Those of skill in the art will also be aware that the BLE standard specifies that Bluetooth 404 channels '37', '38', and '39' be used solely as BLE advertisement 410 channels. Furthermore, the remaining 37 channels are to be used for data exchange between BLE-enabled devices during a BLE connection. As shown in FIG. 4, at any particular point in time, some of these BLE data channels will be available 412 or unavailable 414 for the exchange of data during a BLE connection.

During BLE advertisement, a BLE-enabled device typically transmits the same advertisement packet, described in greater detail herein, on BLE advertisement 410 channels '37,' '38,' and '39' at the same time. However, these channels are fixed and do not adapt to interference from Wireless Fidelity (WiFi) 416 channels that may be in use on the same 2.4 GHz ISM band 402. Accordingly, as likewise shown in FIG. 4, BLE advertisement 410 channels '37,' '38,' and '39' are intentionally spaced out across the 2.4 GHz ISM band 402.

As a result, if any individual BLE advertisement 410 channel is blocked due to interference from a corresponding WiFi channel, the other BLE advertisement 410 channels are likely to be free since they are separated by intermediate available 412 and unavailable 414 BLE data channels. For example, as shown in FIG. 4, BLE advertisement 410 channels '37' and '38' are respectively blocked by WiFi channels '1' 418 and '6' 420. Conversely, BLE advertisement 410 channel '39' is not blocked by WiFi channel '11' 422.

However, there may be times when all three BLE advertisement 410 channels '37,' '38,' and '39' are blocked by interference from a corresponding WiFi 416 channel, such as WiFi 416 channels '1" 418. '6' 420, and '11' 422. As an example, three BLE-enabled devices may be in relatively close proximity to one another (e.g., within ten feet) in a fairly small collaboration room (e.g., fifteen feet by twenty feet). In this example, the collaboration room may be implemented with a wireless dock, a large display monitor, and a WiFi-enabled router. In addition, there may be no additional WiFi traffic occurring within 400 feet of the WiFi-enabled router. Accordingly, it is unlikely that all three BLE 410 channels would simultaneously experience interference from WiFi traffic within the collaboration room.

Conversely, twenty BLE-enabled devices may be in relatively close proximity to one another (e.g., within fifteen feet) in a somewhat larger collaboration room (e.g., twenty five feet by thirty feet), likewise implemented with a wireless dock, a large display monitor, and a WiFi-enabled router. However, in this example there may also be additional WiFi traffic occurring within 400 feet of the WiFi-enabled router from adjacent collaboration rooms. As a result, it is entirely possible that all three BLE 410 channels would simultaneously experience interference from WiFi traffic. As a result, detecting the presence of a particular BLE-enabled device within the collaboration room may become problematic as its advertisement channels may be blocked.

Accordingly, in various embodiments, the remaining 37 Bluetooth 404 data channels may be implemented as secondary BLE advertisement 410 channels, in addition to primary BLE advertisement 410 channels '37,' '38,' and '39,' to yield a total of 40 possible Bluetooth 404 channels that can be used for BLE advertisement. In certain of these embodiments, primary Bluetooth 404 channels '37,' '38,' and '39' may continue to be implemented as primary BLE advertisement 410 channels while one or more available 412 BLE data channels may be implemented to be used for both BLE advertisement and data exchange between BLE-enabled host and client devices during a BLE connection. In these embodiments, the information exchanged during such a BLE connection may be used to establish an ad-hoc mesh network environment, as likewise described in greater detail herein. In certain embodiments, the information exchanged to establish an ad-hoc mesh network environment may be proprietary, related to one or more BLE-enabled devices, or a particular BLE and WiFi-enabled environment, or a combination thereof. In certain embodiments, the method by which the one or more available 412 BLE data channels are selected to be used as a BLE advertisement 410 channel, and the information selected to be exchanged during a particular Bluetooth connection to establish an ad-hoc, mesh network environment, is a matter of design choice.

Figure 5:
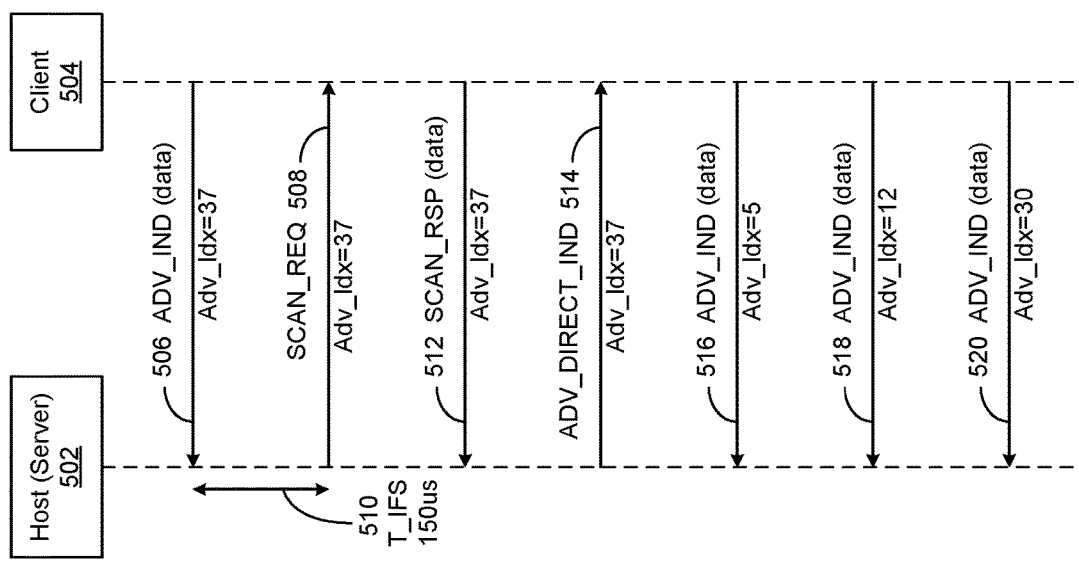
FIG. 5 shows a simplified communications process flow of BLE advertisement data between a host device and a client device to reconfigure the client device with additional advertisement channels.

FIG. 5 shows a simplified communications process flow of Bluetooth Low Energy (BLE) advertisement data between a host BLE device and a client BLE device to reconfigure the client BLE device with additional advertisement channels implemented in accordance with an embodiment of the invention. In certain embodiments, a BLE-enabled client 504 device may be implemented to broadcast an undirected advertisement (ADV_IND) on BLE channel '37' in step 506, which can be received by a BLE-enabled host 502 device. Within a predetermined time interval, such as an inter frame space (T_IFS) 510 time interval of 150 µs, the BLE-enabled host 502 device may be implemented to respond in step 508 with a scan request (SCAN_REQ) to the BLE-enabled client 504 device to send additional data to the BLE-enabled host 502 device via the original BLE advertisement channel (e.g., BLE channel '37'). In certain embodiments, the additional data may be implemented to include certain contextual information associated with the BLE-enabled client 504 device, such as configuration information, operational status, or communication capabilities, or a combination thereof.

In response, the BLE-enabled client 504 device may be implemented to respond with a scan response (SCAN_RSP) in step 512 over the same BLE channel with additional data, such as certain configuration data, corresponding to the BLE-enabled client 502 device. In turn, the BLE-enabled host 502 device may be implemented to provide a directed advertisement command (ADV_DIRECT_IND) to the BLE-enabled client 504 device in step 514 over the same BLE channel. In various embodiments, the directed advertisement command (ADV_DIRECT_IND) provided to the BLE-enabled client 504 device in step 514 may include a set of BLE data channels, such as BLE channels '5,' '12,' and '30,' configured by the host 502 device as secondary BLE advertisement channels, as described in greater detail herein.

In these embodiments, certain BLE Adaptive Frequency Hopping (AFH) approaches known to skilled practitioners of the art may be implemented to block the secondary BLE advertisement channels configured by the host 502 device from being used as normal BLE data channels. In certain embodiments, the BLE data channels selected by the host 502 device for configuration are non-contiguous and more than 20 Mhz apart, such that other Wireless Fidelity (WiFi) channels that are used after an initial scan will not interfere with the secondary BLE advertisement channels. Thereafter, the BLE-enabled client 504 device may be implemented in steps 516, 518, 520 to respectively enable the secondary BLE advertisement channels, such as BLE channels '5,' '12,' and '30,' to be connected to by the BLE-enabled host 502 device.

Figure 6:
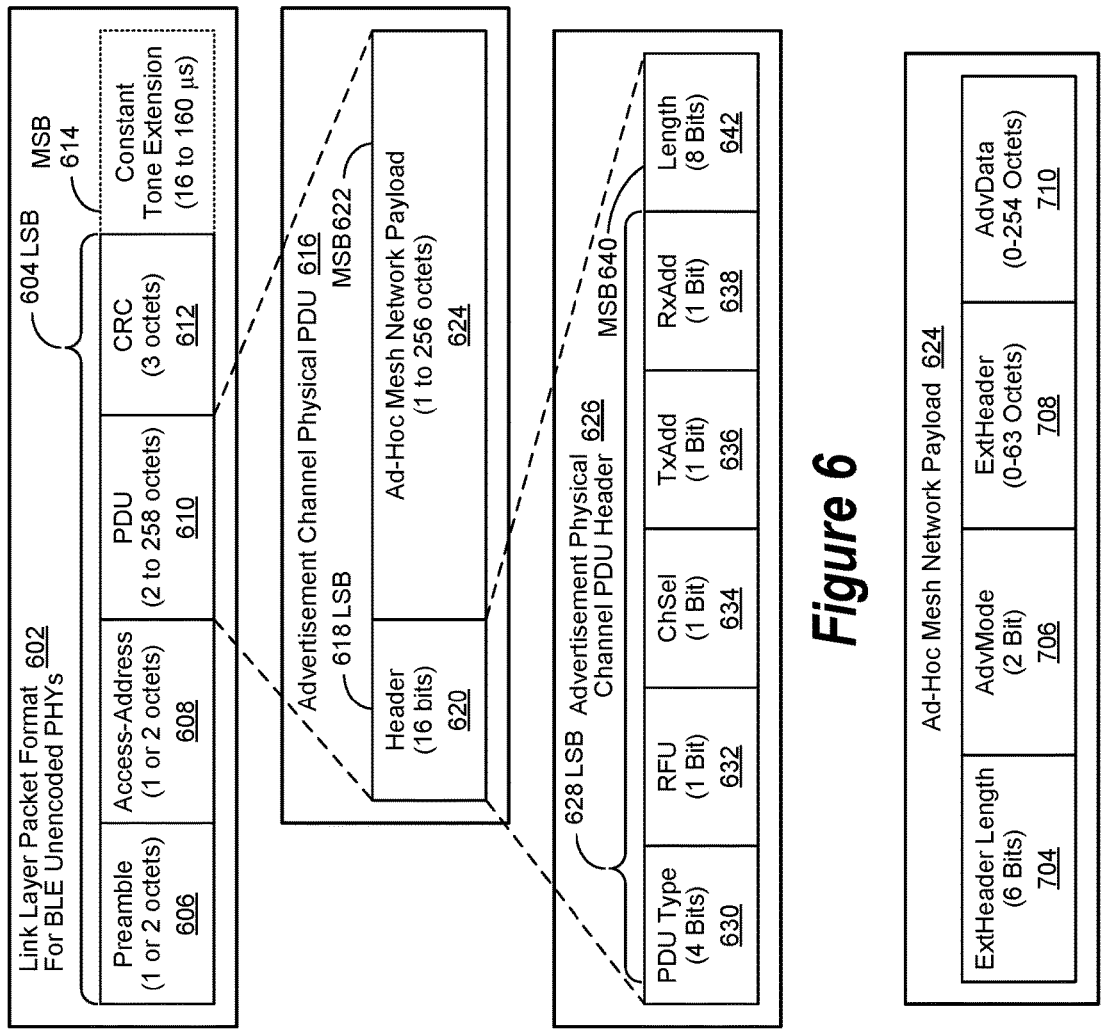
FIG. 6 shows a simplified block diagram of a BLE advertisement packet.

FIG. 6 shows a simplified block diagram of a Bluetooth Low Energy (BLE) advertisement packet implemented in accordance with an embodiment of the invention. In certain embodiments, a BLE advertisement packet may be implemented to include certain link layer packet format 602 information for low BLE unencoded physical (PHY) layers. In certain embodiments, the link layer packet format 602 information may be formatted to include a least significant bit (LSB) 604 segment and a most significant bit (MSB) 614 segment. In certain embodiments, the LSB 604 segment may be formatted to include a preamble 606 segment with a length of 1 or 2 octets, an access-address 608 segment with a length of 1 or 2 octets, a protocol data unit (PDU) 610 segment with a length of 2 to 258 octets, and a cyclic redundancy check (CRC) 612 segment with a length of 3 octets. In certain embodiments, the MSB 614 segment may be implemented to define the duration of a constant tone extension from 16 µs to 160 µs.

In certain embodiments, the PDU 610 segment may be implemented to include certain BLE advertisement channel physical PDU 616 information. In certain embodiments, the BLE advertisement channel physical PDU 616 information may be formatted to include a LSB 618 segment and a MSB 622 segment. In certain embodiments, the LSB 618 segment may be formatted to include a header 620 segment with a length of 16 bits. In various embodiments, the MSB 622 segment may be implemented to include an ad-hoc mesh network payload 624 segment with a length of 1 to 256 octets.

In certain embodiments, the header 620 segment may be implemented to include certain BLE advertisement physical channel PDU header 626 information. In certain embodiments, the BLE advertisement physical channel PDU 626 information may be formatted to include a LSB 628 segment and a MSB 640 segment. In certain embodiments, the LSB 628 field may be formatted to include a PDU type 630 segment with a length of 4 bits, a reserved for future uses (RFU) 632 segment with a length of 1 bit, a channel select (ChSel) 634 segment with a length of 1 bit, a transmission address (TxAdd) segment with a length of 1 bit, and a receive address (RxAdd) 638 segment with a length of 1 bit. In various embodiments, the MSB 640 segment may be implemented with a length of 8 bits.

Figure 7:
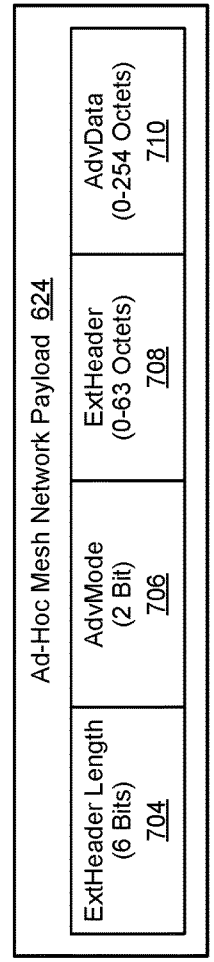
FIG. 7 shows a simplified block diagram of an ad-hoc mesh network payload format.

FIG. 7 shows a simplified block diagram of an ad-hoc mesh network payload format implemented in accordance with an embodiment of the invention. In various embodiments, certain information contained in the ad-hoc mesh network payload 624 segment, described in greater detail herein, may be used by to establish an ad-hoc, mesh network environment, as likewise described in greater detail herein. In certain embodiments, the ad-hoc mesh network payload 624 segment, may be formatted to include an extended header length (ExtHeader Length) 704 segment with a length of 6 bits, an advanced mode (AdvMode) 706 segment with a length of 2 bits, an extended header (ExtHeader) 708 segment with a length of 0-63 octets, and an advertisement data (AdvData) 710 segment with a length of 0-254 octets.

In certain embodiments, the ExtHeader Length 704 segment may be implemented to contain a value between 0 and 63, which is used to define the length of the ExtHeader 708 segment. In various embodiments, the AdvMode 706 segment may be implemented to define a Bluetooth Low Energy (BLE) advertisement mode. In certain embodiments, the BLE advertisement mode may be defined as non-connectable and non-scannable; connectable and non-scannable; or non-connectable and scannable. In various embodiments, the ExtHeader 708 segment may be implemented to define certain attributes of an extended BLE advertisement event for a particular use case, such as collaboration room user and device management, or node-types, such as laptop screen, microphone, gaming controller, collaboration screen, composite device (e.g., combined screen and microphone), and so forth. In various embodiments, the AdvData 714 segment may be implemented to contain certain BLE advertisement data corresponding to an associated BLE-enabled device, such as its node capabilities, control information, an so forth.

Figure 8:
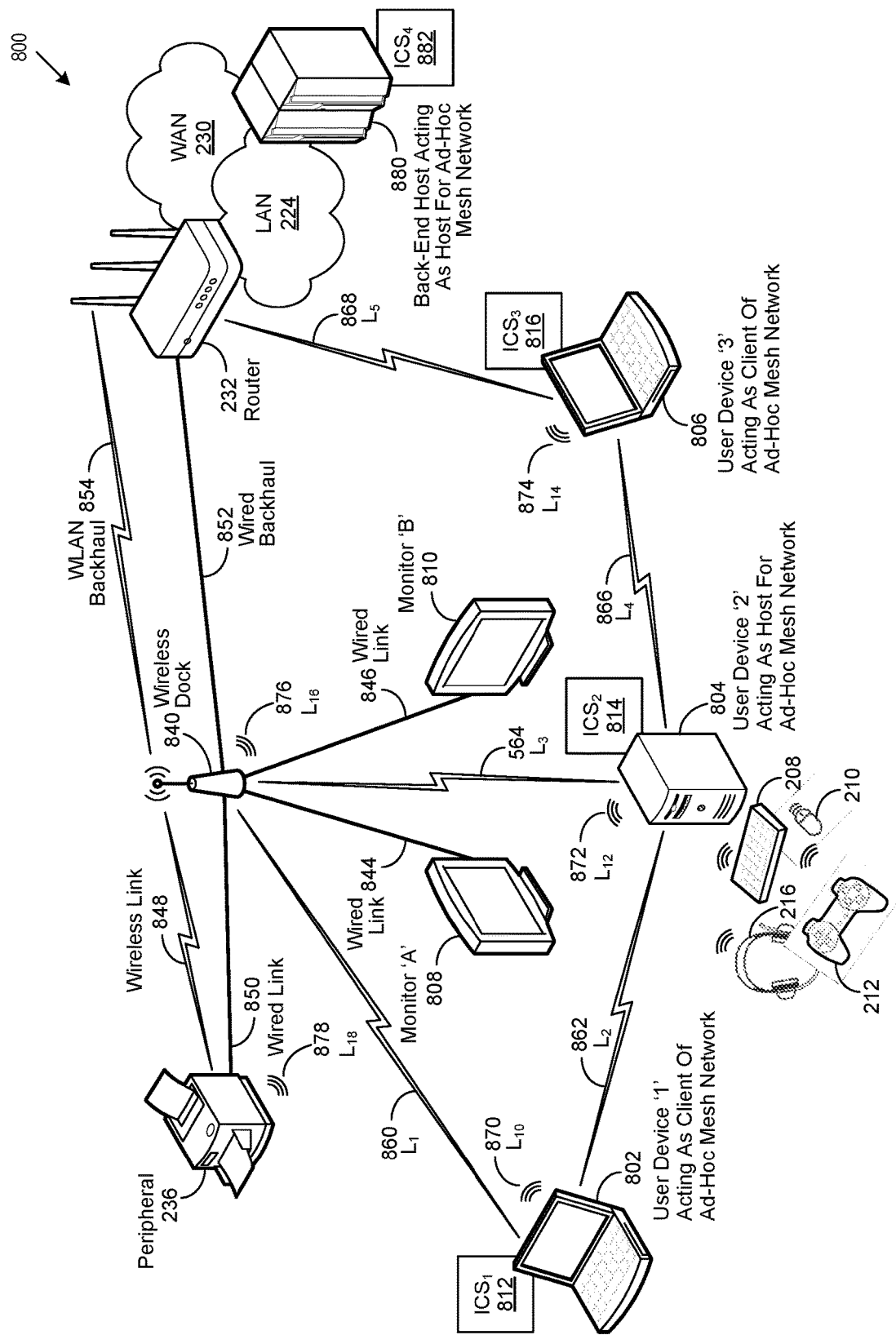
FIG. 8 shows a simplified block diagram of an ad-hoc mesh network environment.

FIG. 8 shows a simplified block diagram of an ad-hoc mesh network environment implemented in accordance with an embodiment of the invention. In certain embodiments, one or more Bluetooth Low Energy (BLE) interference avoidance operations may be performed to establish an ad-hoc, mesh network environment 800. As used herein, a BLE interference avoidance operation broadly refers to any operation performed to avoid interference between a primary or secondary BLE advertisement channel and a Wireless Fidelity (WiFi) channel concurrently using the same frequency, as described in greater detail herein.

Skilled practitioners of the art will be familiar with the concept of a mesh network, which refers to a Local Area Network (LAN) topology in which the network nodes, such as user devices '1' 802, '2' 804, and '3' 806, wireless docks 840, bridges, switches, and other network infrastructure devices, such as a back-end server 880, connect directly, dynamically, and non-hierarchically to as many other nodes as possible. Those of skill in the art will also be aware that that mesh networks enable their associated nodes to cooperate with one another to efficiently route data. In certain embodiments, an intelligent communication system (ICS), described in greater detail herein, may be implemented with an associated BLE-enabled device to perform the one or more BLE interference avoidance operations to establish the ad-hoc mesh network environment 800.

For example, as shown in FIG. 8, user devices '1' 802, '2' 804, and '3' 806 are respectively implemented with intelligent communication systems $ICS_1$ 812, $ICS_2$ 814, and $ICS_3$ 812. To continue the example, user devices '1' 802, '2' 804, and '3' 806 are likewise respectively BLE-enabled with BLE link capabilities $L_{10}$ 870, $L_{12}$ 872, and $L_{14}$ 874. Likewise, the wireless dock 840 and peripheral 236 are respectively BLE-enabled with BLE link capabilities $L_{16}$ 876, and $L_{18}$ 878. In certain embodiments, as described in greater detail herein, user devices '1' 802, '2' 804, '3' 806, the wireless dock 840, and the peripheral 236 may be implemented to respectively use BLE link capabilities $L_{10}$ 870, $L_{12}$ 872, $L_{14}$ 874, $L_{16}$ 876, and $L_{18}$ 878 to advertise their presence to one another.

In certain embodiments, a particular user device and an associated ICS, such as user device '2' 804 and $ICS_2$ 814, may be implemented to act as a host for the ad-hoc mesh network environment 800, as described in greater detail herein. Alternatively, in certain embodiments a back-end server and an associated ICS, such as the back-end server 880 and $ICS_4$ 882 shown in FIG. 8, may be implemented to act as a host for the ad-hoc mesh network environment 800. In these embodiments, the decision of whether to use a particular user device and an associated ICS, such as user device '2' 804 and $ICS_2$ 814, or a back-end server and an associated ICS, such as the back-end server 880 and $ICS_4$ 882, to act as a host for the ad-hoc mesh network environment 800 is a matter of design choice.

In certain embodiments, the ad-hoc, mesh network environment 800 shown in FIG. 4 may be WiFi-enabled. Accordingly, in certain embodiments, one or more primary BLE advertisement channels may be blocked due to interference from a corresponding WiFi channel, as described in greater detail herein. As likewise described in greater detail herein, one or more BLE interference avoidance operations may be performed in various embodiments to configure one or more available BLE data channels to operate as a secondary BLE advertisement channel. In certain of these embodiments, as likewise described in greater detail herein, such secondary BLE advertisement channels may be implemented to provide certain information used to establish the ad-hoc, mesh network environment 800.

In certain embodiments, a router 232, familiar to skilled practitioners of the art, may be implemented to provide the ad-hoc network environment 800 connectivity to a Local Area Network (LAN) 224, or a Wide Area Network (WAN) 230, or both. In certain embodiments, a wireless dock 840, familiar to those of skill in the art, may be implemented to establish network connectivity with the router 232 via a wired 850 backhaul connection (e.g., an Ethernet connection), or one or more Wireless Local Area Network (WLAN) 852 backhaul connections.

In certain embodiments, the wireless dock 840 may likewise be implemented to respectively provide user devices '1' 802 and '2' 804 wireless access to the LAN 224, or the WAN 230, or both, via Wireless Local Area Network (WLAN) links $L_1$ 854 and $L_3$ 858. In certain embodiments, the router 232 may be implemented to provide user device '3' 806 access to the LAN 224, or the WAN 230, or both, via a WLAN link $L_5$ 862. Likewise, in certain embodiments, WLAN links $L_2$ 856 and $L_4$ 860 may respectively be implemented to provide user device '2' 822 peer-to-peer connections to user devices '1' 802 and '3' 806.

Likewise, in certain embodiments, the wireless dock 840 may be implemented to establish one or more network links to one or more peripherals 236, such as a printer, via a wired 848 network link, or one or more WLAN 846 links, or a combination thereof. In certain embodiments, the wireless dock 840 may be implemented to respectively provide a connection to one or peripherals, such as monitors 'A' 808 and 'B' 810 via wired connections 842 and 844. Examples of such wired connections 842 and 844 include a Universal Serial Bus (USB) connection, an IEEE 1394 connection, a Digital Visual Interface (DVI) connection, a DisplayPort connection, a High-Definition Multimedia Interface (HDMI) connection, and so forth. In certain embodiments, the wireless dock 840 may likewise be implemented to provide one or more Personal Area Network (PAN) links with one or more input/output (I/O) devices, such as a keyboard 208, a mouse 210, a gaming controller 212, a headset 216, and so forth.

In various embodiments, one or more BLE interference avoidance operations may be performed to broadcast a BLE advertisement on a secondary BLE advertisement channel, as described in greater details herein. In certain of these embodiments, the BLE advertisement may be implemented as a BLE private beacon. In certain embodiments, such a BLE private beacon may be triggered based upon the detection of an associated BLE-enabled device according to its location, such as within the boundaries of a collaboration room. In various embodiments, certain BLE-based location detection approaches known to skilled practitioners of the art may be used to determine the location of the BLE-enabled device. In certain embodiments, one or more elements of the IEEE 802.11mc standard may likewise be used to determine the location of the BLE-enabled device.

In certain embodiments, the location information used to trigger a BLE private beacon may be used for the management of a collaboration meeting, familiar to those of skill in the art. In various embodiments, a BLE-enabled device may not be implemented for location detection. In certain of these embodiments, one or more BLE interference avoidance operations may be triggered when the number of available BLE advertisement channels drops below a specified threshold indicating a congested communications environment.

In various embodiments, one or more BLE interference avoidance operations may be implemented to scan an ad-hoc mesh network environment 800 to determine which WiFi channels are active. In certain of these embodiments, the resulting scan information may be used to determine which portions of the shared BLE and WiFi 2.4 GHz radio spectrum is available for use as a BLE channel. In certain embodiments, the resulting determination of which portions of the shared BLE and WiFi 2.4 GHz radio spectrum is available for use as a BLE channel may be used for dynamic determination of which BLE channels are being used as primary BLE advertisement channels, described in greater detail herein.

In various embodiments, one or more BLE interference avoidance operation policies may be implemented when configuring a BLE data channel for use as a secondary BLE advertisement channel. In various embodiments, a BLE interference avoidance operation policy may be implemented to continue using one or more primary BLE advertisement channels (e.g., BLE channels '37', '38. and '39) will continue to be used for default BLE advertisement channels. In certain of these embodiments, the primary BLE advertisement channels will not be configured as secondary BLE advertisement channels.

In certain embodiments, a BLE interference avoidance operation policy may be implemented to allocate each BLE-enabled device within the ad-hoc mesh network environment a minimum of three BLE advertisement channels. In these embodiments, each of the allocated BLE advertisement channels may be either a primary or a secondary BLE advertisement channel. In these embodiments, the designated host device, such as user device '2' 804 or back-end host 880, may be implemented to perform the allocation of primary or secondary BLE advertisement channels to each BLE-enabled device within the ad-hoc mesh network environment 800. In certain embodiments, the primary or secondary BLE advertisement channels allocated to each BLE-enable device in the ad-hoc mesh network environment 800 may be configured to use directed non-connectable advertisement packets over the same BLE advertisement channel on which a BLE advertisement is received.

In various embodiments, a BLE interference avoidance operation policy may be implemented to configure a private beacon as an asset tracking beacons. In certain of these embodiments, the private beacon may be configured to be muted while its associated BLE-enabled device detects location-based beacons from the host 804, 880 device to enable the asset tracking beacons when the BLE-enabled device leaves the ad-hoc mesh network environment 800 room and the host beacon is lost. Certain embodiments of the invention reflect an appreciation that the use of such a BLE interference avoidance operation policy may further reduce interference between BLE beacons.

In certain embodiments, a BLE interference avoidance operation policy may be implemented for client BLE-enabled devices, such as user devices '1' 802 and '3' 806, to send directed non-connectable advertisements using PDU type ADV_NONCONN_IND with specially-formatted data on secondary BLE advertisement channels that can be parsed by the host 804, 880. Certain embodiments of the invention reflect an appreciation that implementation of such a BLE interference avoidance operation policy would result in other client BLE-enabled devices not scanning the secondary BLE advertisement channel since they are directed towards the host 804, 880 device. In certain embodiments, a BLE interference avoidance operation policy may be implemented for the host 804, 880 device to communicate with a particular BLE-enabled device without connecting with the device.

In various embodiments, a private beacon may be implemented to use encryption to secure out-of-band (OOB) exchange of data between the host 804, 880 and certain BLE-enabled client devices. From the foregoing, skilled practitioners of the art will recognize that implementation of such BLE interference avoidance operations in certain embodiments will likely result in more efficient and effective use of available connectivity for BLE-enabled devices to advertise their presence to other BLE-enabled devices. Likewise, the use of certain BLE interference operations in certain embodiments can enable the establishment, and management, of an ad-hoc mesh network environment 800. Those of skill in the art will recognize that many such embodiments are possible. Accordingly, the foregoing is not intended to limit the spirit, scope, or intent of the invention.

Figure 9A:
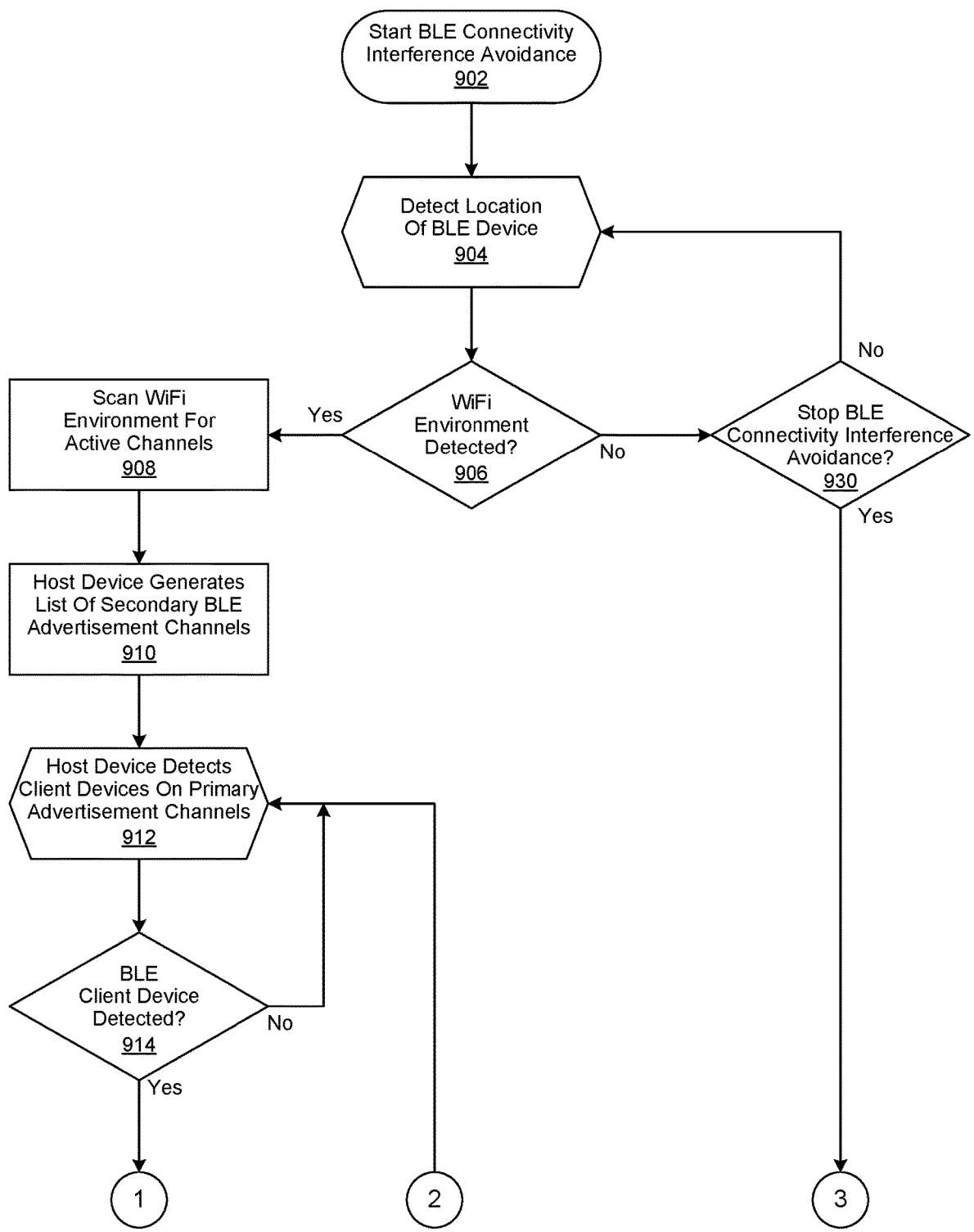
FIGS. 9a and 9b are a flowchart showing the performance of BLE connectivity interference avoidance operations.
Figure 9B:
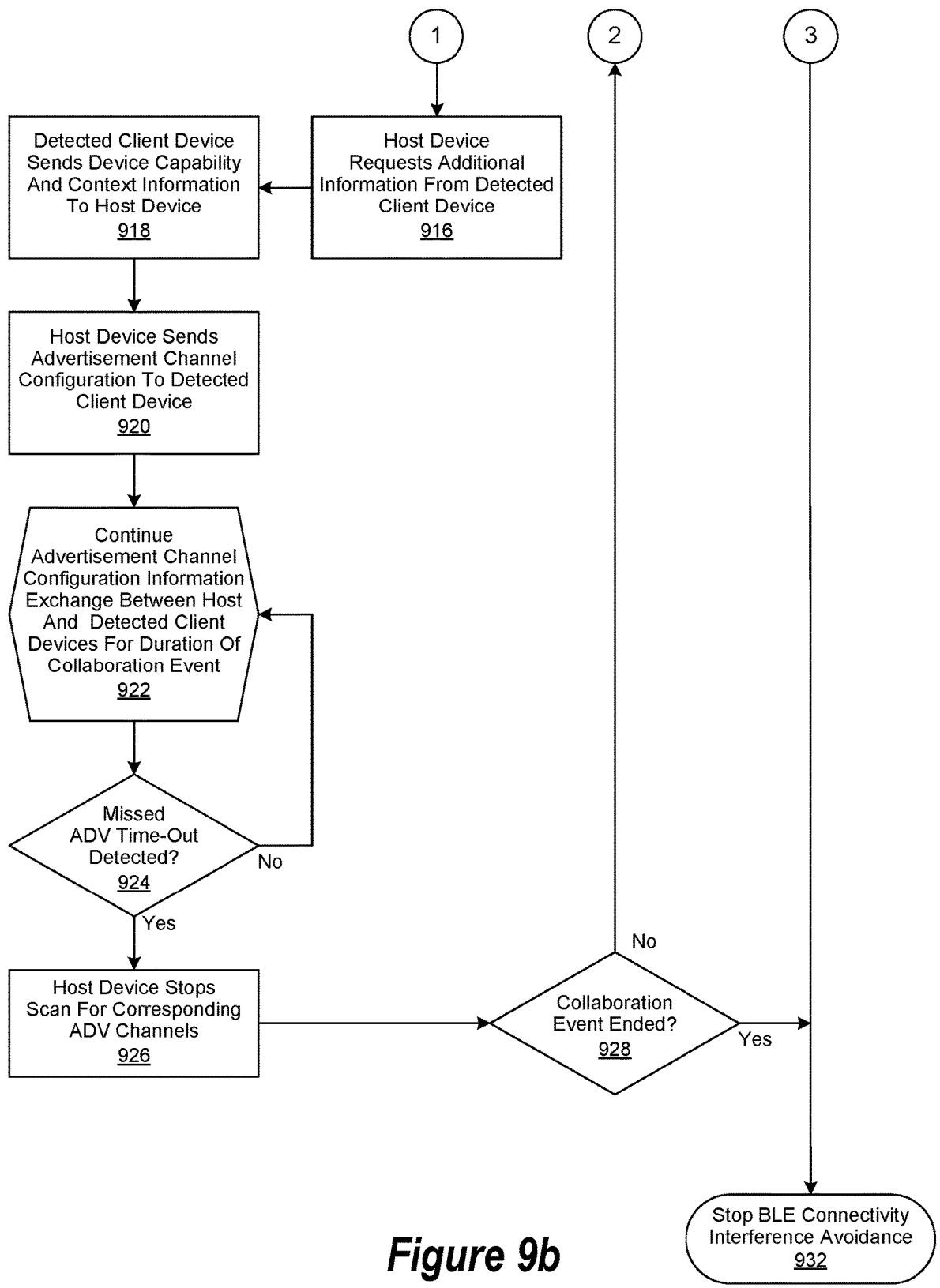

FIGS. 9a and 9b are a flowchart showing the performance of Bluetooth Low Energy (BLE) connectivity interference avoidance operations implemented in accordance with an embodiment of the invention. In this embodiment, BLE connectivity interference avoidance operations are begun in step 902, followed by ongoing operations being performed at regular intervals in step 904 to detect the location of a BLE-enabled device. In certain embodiments, the duration of the interval used to determine the location of a particular BLE-enabled device (e.g., 150 µs) is a matter of design choice. As the location of a particular BLE-enabled device is determined in step 904 at the end of each designated time interval, a determination is made in step 906 whether the presence of a Wireless Fidelity (WiFi) environment, such as a WiFi-enabled collaboration room, has been detected.

If not, then a determination is made in step 930 whether to end BLE connectivity interference avoidance operations. If not, then the process is continued, proceeding with step 904. Otherwise, BLE connectivity interference avoidance operations are ended in step 932. However, if it was determined in step 906 that a WiFi environment has been detected, then the WiFi environment is scanned in step 908 for which WiFi channels are currently active. The designated BLE connectivity interference avoidance host, described in greater detail herein, then generates a list of secondary BLE advertisement channels (e.g., BLE channels '0' through '36'), likewise described in greater detail herein, in step 910.

Ongoing operations are then performed in step 912 by the BLE connectivity interference avoidance host to detect the presence of a BLE-enabled client device on a primary BLE advertisement channel (i.e., BLE advertisement channels '37', '38', and '39'). A determination is then made in step 914 whether a BLE-enabled device has been detected. If not, the process is continued, proceeding with step 912.

Otherwise, the BLE connectivity interference avoidance host requests additional information from the BLE client device in step 918. In response, the detected BLE client device sends certain device capability and context information to the BLE connectivity interference avoidance host in step 918. Once the information is received by the BLE connectivity interference avoidance host, it is processed to generate a BLE advertisement channel configuration, which is sent to the BLE client device in step 920.

Ongoing operations are then performed in step 922 to exchange BLE advertisement configuration information between the BLE connectivity interference avoidance host and the detected client for the duration of an associated collaboration event, described in greater detail herein. Concurrently, a determination is made in step 924 whether a BLE advertisement time-out has been detected. If not, then the process is continued, proceeding with step 922. Otherwise, the BLE connectivity interference avoidance host stops scanning for advertisements from the detected BLE client device, followed by a determination being made in step 928 whether the collaboration event has ceased. If not, the process is continued, proceeding with step 912. Otherwise, BLE connectivity interference avoidance operations are ended in step 932.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for avoiding interference between a plurality of communication protocols, comprising:
configuring a host to detect a Bluetooth Low Energy (BLE) client device, the host being BLE enabled;
using the host to detect whether the BLE client device is present;
triggering a private beacon when the BLE client device is present, the private beacon being configured as an asset tracking beacon, the private beacon being triggered when a host beacon is lost;
identifying active WiFi channels associated with the host and the BLE client device;
configuring the host to communicate with a BLE client device via a Bluetooth Low Energy (BLE) connection, the BLE connection comprising a plurality of channels, the device functioning as a BLE-enabled host device; and,
establishing an ad-hoc, mesh network between the host and the BLE client device using the active WiFi channels and the BLE connection.

2. The method of claim 1, wherein:
the plurality of channels include a plurality of channels used for BLE advertisement.

3. The method of claim 2, wherein:
the plurality of channels include a channel implemented to be used for BLE advertisement and data exchange between the BLE-enabled host device and the client BLE device during the BLE connection.

4. The method of claim 1, wherein:
the client BLE device is allocated a plurality of advertisement channels by the BLE-enabled host device.

5. The method of claim 4, wherein:
the client BLE device receives an advertisement over a particular advertisement channel; and,
the plurality of advertisement channels are allocated using directed non-connectable advertisement packets over the particular advertisement channel.

6. The method of claim 1, wherein:
the private beacon is encrypted and used for out of band private data exchange between the host and the client BLE device.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
configuring a host to detect a Bluetooth Low Energy (BLE) client device, the host being BLE enabled;
using the host to detect whether the BLE client device is present;
triggering a private beacon when the BLE client device is present, the private beacon being configured as an asset tracking beacon, the private beacon being triggered when a host beacon is lost;
identifying active WiFi channels associated with the host and the BLE client device;
configuring the host to communicate with a BLE client device via a Bluetooth Low Energy (BLE) connection, the BLE connection comprising a plurality of channels, the device functioning as a BLE-enabled host device; and,
establishing an ad-hoc, mesh network between the host and the BLE client device using the active WiFi channels and the BLE connection.

8. The system of claim 7, wherein:
the plurality of channels include a plurality of channels used for BLE advertisement.

9. The system of claim 8, wherein:
the plurality of channels include a channel implemented to be used for BLE advertisement and data exchange between the BLE-enabled host device and the client BLE device during the BLE connection.

10. The system of claim 7, wherein:
the client BLE device is allocated a plurality of advertisement channels by the BLE-enabled host device.

11. The system of claim 10, wherein:
the client BLE device receives an advertisement over a particular advertisement channel; and,
the plurality of advertisement channels are allocated using directed non-connectable advertisement packets over the particular advertisement channel.

12. The system of claim 7, wherein:
the private beacon is encrypted and used for out of band private data exchange between the host and the client BLE device.

13. A non-transitory, computer-readable storage medium embodying computer program code, the computer program code comprising computer executable instructions configured for:
configuring a host to detect a Bluetooth Low Energy (BLE) client device, the host being BLE enabled;
using the host to detect whether the BLE client device is present;
triggering a private beacon when the BLE client device is present, the private beacon being configured as an asset tracking beacon, the private beacon being triggered when a host beacon is lost;
identifying active WiFi channels associated with the host and the BLE client device;
configuring the host to communicate with a BLE client device via a Bluetooth Low Energy (BLE) connection, the BLE connection comprising a plurality of channels, the device functioning as a BLE-enabled host device; and,
establishing an ad-hoc, mesh network between the host and the BLE client device using the active WiFi channels and the BLE connection.

14. The non-transitory, computer-readable storage medium of claim 13, wherein:
the plurality of channels include a plurality of channels used for BLE advertisement.

15. The non-transitory, computer-readable storage medium of claim 14, wherein:

the plurality of channels include a channel implemented to be used for BLE advertisement and data exchange between the BLE-enabled host device and the client BLE device during the BLE connection.

16. The non-transitory, computer-readable storage medium of claim 13, wherein:
the client BLE device is allocated a plurality of advertisement channels by the BLE-enabled host device.

17. The non-transitory, computer-readable storage medium of claim 16, wherein:
the client BLE device receives an advertisement over a particular advertisement channel; and,
the plurality of advertisement channels are allocated using directed non-connectable advertisement packets over the particular advertisement channel.

18. The non-transitory, computer-readable storage medium of claim 13, wherein:
the private beacon is encrypted and used for out of band private data exchange between the host and the client BLE device.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *